(12) United States Patent
Jung

(10) Patent No.: US 8,965,656 B2
(45) Date of Patent: Feb. 24, 2015

(54) MOTOR-DRIVEN BOOSTER TYPE BRAKE SYSTEM AND METHOD THEREOF

(75) Inventor: Wan Kyo Jung, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 694 days.

(21) Appl. No.: 13/347,268

(22) Filed: Jan. 10, 2012

(65) Prior Publication Data

US 2013/0024083 A1    Jan. 24, 2013

(30) Foreign Application Priority Data

Jul. 22, 2011   (KR) ........................ 10-2011-0073264

(51) Int. Cl.
| B60T 8/176 | (2006.01) |
|---|---|
| B60T 13/66 | (2006.01) |
| B60T 7/04 | (2006.01) |
| B60T 8/32 | (2006.01) |
| B60T 8/40 | (2006.01) |
| B60T 13/74 | (2006.01) |
| B60T 8/48 | (2006.01) |

(52) U.S. Cl.
CPC .............. B60T 7/042 (2013.01); B60T 8/4836 (2013.01); B60T 2270/14 (2013.01); B60T 8/176 (2013.01); B60T 8/3265 (2013.01); B60T 8/4077 (2013.01); B60T 13/745 (2013.01)
USPC .......................................................... 701/78

(58) Field of Classification Search
USPC .......................................................... 701/78
See application file for complete search history.

(56) References Cited

U.S. PATENT DOCUMENTS

| 5,163,743 | A | * | 11/1992 | Leppek et al. ................ 303/155 |
|---|---|---|---|---|
| 5,184,299 | A | * | 2/1993 | Hogan et al. ..................... 701/78 |
| 5,219,214 | A | * | 6/1993 | Savage et al. .............. 303/115.2 |
| 5,234,262 | A | * | 8/1993 | Walenty et al. ............... 303/155 |
| 5,273,349 | A | * | 12/1993 | Kidston ......................... 303/162 |
| 5,281,009 | A | * | 1/1994 | Kidston et al. ................ 303/162 |
| 5,308,153 | A | * | 5/1994 | Kidston et al. ................ 303/162 |
| 6,361,128 | B1 | * | 3/2002 | Riddiford et al. .......... 303/115.2 |
| 2007/0205658 | A1 | * | 9/2007 | Sato et al. ........................ 303/10 |
| 2011/0074207 | A1 | * | 3/2011 | Arakawa ......................... 303/10 |

FOREIGN PATENT DOCUMENTS

| JP | 2009006756 A | * | 1/2009 |
|---|---|---|---|
| JP | 2011073517 A | * | 4/2011 |

* cited by examiner

*Primary Examiner* — Shelley Chen
(74) *Attorney, Agent, or Firm* — Saliwanchik, Lloyd & Eisenschenk

(57) ABSTRACT

The present disclosure provides a motor-driven booster type brake system and method thereof. The brake system includes a pedal force sensor for detecting pedal force of a driver applied to a brake pedal, a master cylinder delivering hydraulic pressure to wheel brakes, a booster delivering multiplied force to the master cylinder using a motor, and an ECU controlling the motor based on a detection value of the pedal force. In the brake system, the ECU controls the motor based on hydraulic pressure delivered from the master cylinder to the wheel brakes if an ABS mode is not activated, and controls the motor by maintaining an electric current input to the motor to be within a preset range of electric current if the ABS mode is activated.

10 Claims, 4 Drawing Sheets

MOTOR-DRIVEN BOOSTER TYPE BRAKE SYSTEM AND METHOD THEREOF

CROSS-REFERENCE TO RELATED APPLICATION

This application claims the benefit under 35 U.S.C. §119 of Korean Patent Application No. 10-2011-0073264, filed Jul. 22, 2011, which is hereby incorporated by reference in its entirety.

BACKGROUND

1. Technical Field

The present disclosure generally relates to a motor-driven booster type brake system and method thereof. More particularly, the present disclosure relates to a motor-driven booster type brake system and method thereof, which is configured to generate hydraulic pressure in a master cylinder through multiplication of force using a motor of a motor-driven booster to achieve vehicle braking

2. Description of the Related Art

The background art of the present disclosure is disclosed in Korean Patent Laid-open Publication No. 2010-0098847 (Laid-open Date: Sep. 10, 2010).

Typically, in a motor-driven booster type brake system, when a driver presses on a brake pedal, a pedal force sensor detects pedal force of the driver and an electronic control unit (ECU) drives a motor of the booster based on the detection result of the sensor to deliver a multiplied force to a master cylinder. The master cylinder delivers hydraulic pressure to wheel brakes, i.e. front and rear wheel brakes, based on the multiplied force delivered from the booster. Then, an electronic stability controller (ESC) adjusts the hydraulic force delivered to the front and rear wheel brakes according to a braking mode to permit suitable braking In other words, the ESC allows a brake oil to be supplied to the respective wheel brakes in a normal operation mode. However, in an anti-lock brake system (ABS) mode, that is, when a locking phenomenon occurs in at least one wheel, the ESC allows braking of the ABS to be performed by closing some of oil passages.

However, such a conventional motor-driven booster type brake system has a problem in that, when a vehicle is in an ABS mode, hydraulic pressure applied to the wheel brakes excessively increases or fluctuates in vehicle braking.

Specifically, when generating hydraulic pressure in the master cylinder using the motor-driven booster, the conventional motor-driven booster type brake system compares an actual hydraulic pressure output from the master cylinder with a target hydraulic pressure to adjust the hydraulic pressure of the master cylinder to be in a target range. In this case, however, if some oil passages to the wheel brakes are repeatedly closed or opened in an ABS mode, it is difficult to achieve rapid change of hydraulic pressure output from the master cylinder to provide a suitable pedal force to the respective wheel brakes, casing excessive pressure to be applied to the wheel brakes.

Namely, since the conventional brake system simply compares an actual hydraulic pressure output from the master cylinder with a calculated target hydraulic pressure and changes the motor-driven type booster according to the result of comparison, the brake system cannot rapidly and effectively cope with variation of desired pedal force to be imparted to each of the wheel brakes according to operation of the ABS, so that excessive pedal force is imparted to the wheel brakes or fluctuation or divergence of braking pressure occurs, as indicated by a waveform shown at a lower part of FIG. 1. Furthermore, such an excessive increase of hydraulic pressure can cause failure of the brake system.

In FIG. 1, a waveform shown at an upper part indicates variation of hydraulic pressure delivered from the master cylinder to the wheel brakes, and the waveform shown at the lower part indicates variation of hydraulic pressure imparted to the wheel brakes.

BRIEF SUMMARY

Aspects of the present disclosure are to provide a motor-driven booster type brake system and method thereof, which may suppress fluctuation or divergence of hydraulic pressure or braking pressure due to an excessive increase or decrease in hydraulic pressure delivered from a master cylinder to wheel brakes during vehicle braking in an anti-lock brake system (ABS) mode of a vehicle employing the ABS.

In accordance with one aspect, the present disclosure provides a braking method of a motor-driven booster type brake system which includes a pedal force sensor for detecting pedal force of a driver applied to a brake pedal, a master cylinder delivering hydraulic pressure to wheel brakes, a booster delivering multiplied force to the master cylinder using a motor, and an electronic control unit (ECU) controlling the motor based on a detection value of the pedal force, wherein the ECU controls the motor based on hydraulic pressure delivered from the master cylinder to the wheel brakes if an ABS mode is not activated, and controls the motor by maintaining electric current input to the motor to be within a preset range of electric current if the ABS mode is activated.

The method may include: inputting a braking command; calculating, based on a detection value of the pedal force, a target pressure with respect to the hydraulic pressure delivered from the master cylinder to the wheel brakes; determining whether the ABS mode is activated; if it is determined that the ABS mode is activated, controlling the motor by the ECU; and ascertaining whether the electric current input to the motor is within the preset range of electric current, followed by returning to the controlling the motor, if the electric current input to the motor is not within the preset range of electric current.

The method may further include: if it is determined that the ABS mode is not activated, controlling the motor by the ECU to adjust the hydraulic pressure delivered from the master cylinder to the wheel brakes; and ascertaining whether the hydraulic pressure delivered from the master cylinder to the wheel brakes is within a preset range of pressure, followed by returning to the controlling the hydraulic pressure, if the hydraulic pressure is not within the preset range of pressure.

The preset range of electric current may be set based on the target pressure with respect to the hydraulic pressure. Particularly, the preset range of electric current may be set in proportion to the target pressure.

In accordance with another aspect, the present disclosure provides a motor-driven booster type brake system, which includes: a pedal force sensor for detecting pedal force of a driver pressing on a brake pedal; a master cylinder delivering hydraulic pressure to wheel brakes;
a booster delivering multiplied force to the master cylinder using a motor; and an ECU controlling the motor based on a detection value of the pedal force, wherein the ECU controls the motor based on hydraulic pressure delivered from the master cylinder to the wheel brakes if an ABS mode is not activated, and controls the motor by maintaining electric current input to the motor to be within a preset range of electric current if the ABS mode is activated.

BRIEF DESCRIPTION OF THE DRAWINGS

The above and other aspect, features and advantages of the present disclosure will become apparent from the following description of exemplary embodiments given in conjunction with the accompanying drawings, in which.

DETAILED DESCRIPTION

Exemplary embodiments of the present disclosure will now be described in detail with reference to the accompanying drawings. It should be understood that these embodiments are provided for the purpose of illustration only and the scope of the present disclosure is not limited thereby.

Figure 1:
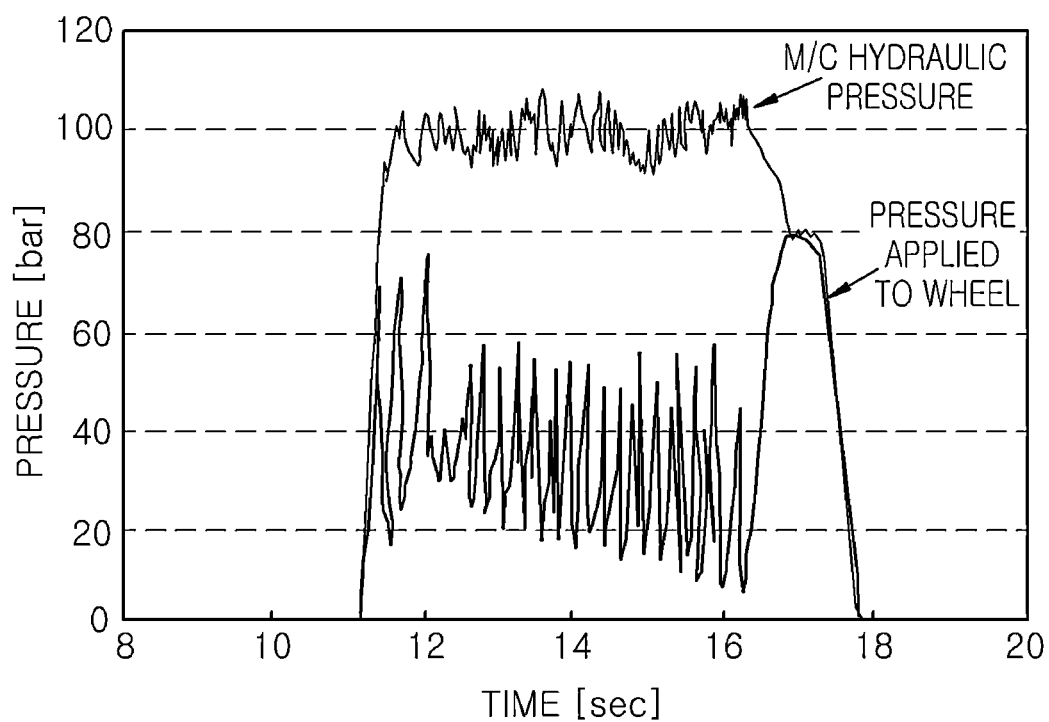
FIG. 1 is a graph depicting variation of hydraulic pressure in a master cylinder and variation of hydraulic pressure imparted to wheel brakes in an ABS mode in a conventional motor-driven booster type brake system.
Figure 2:
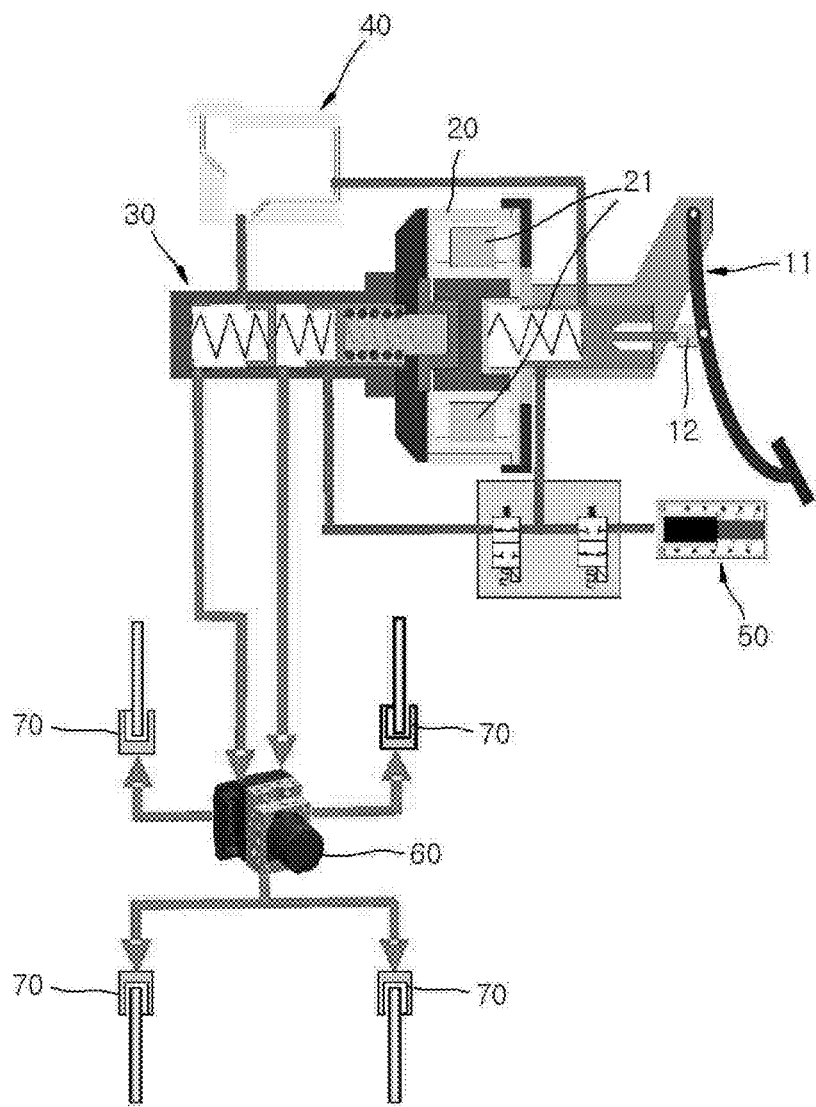
FIG. 2 is a schematic diagram of a motor-driven booster type brake system in accordance with one exemplary embodiment of the present disclosure.
Figure 3:
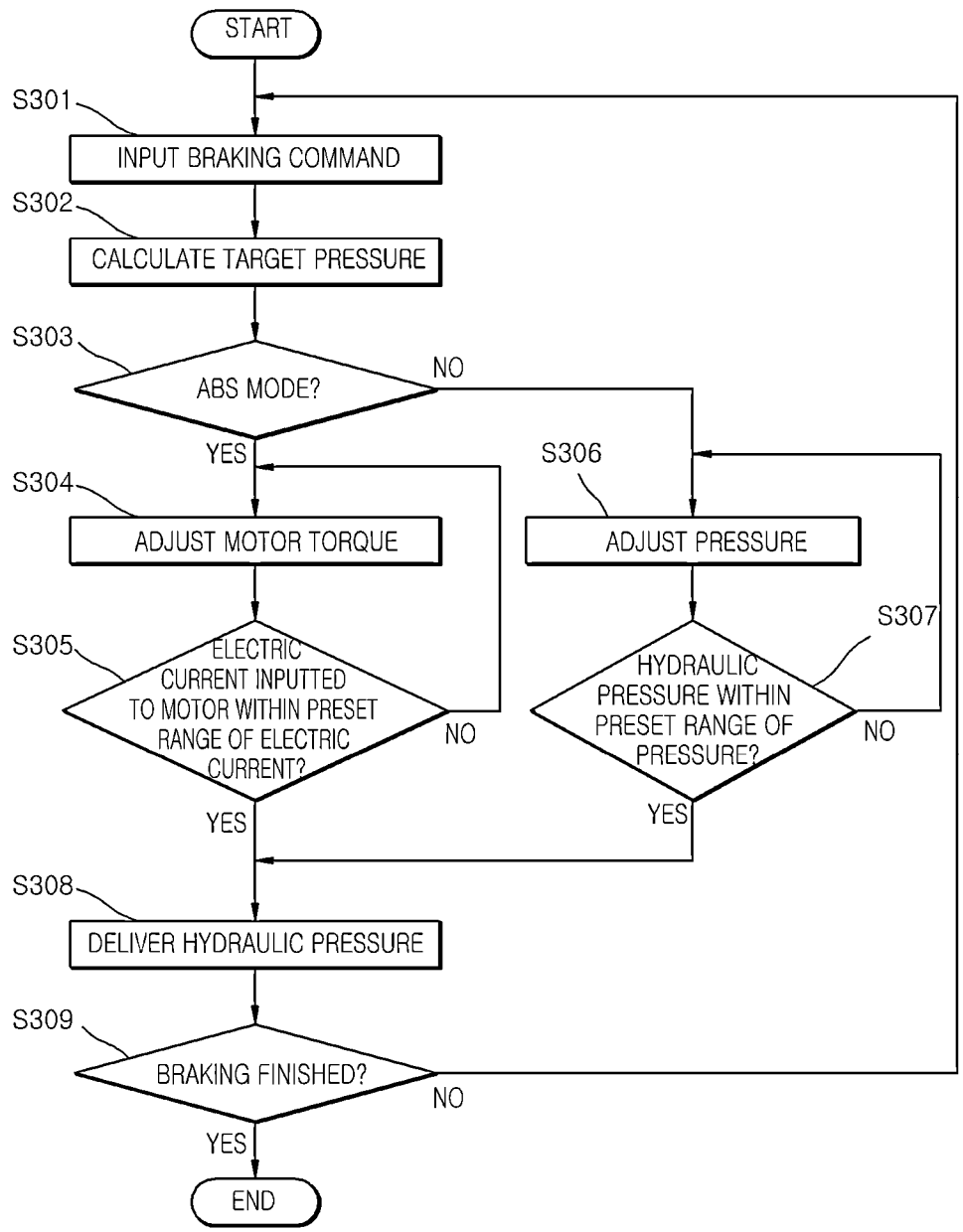
FIG. 3 is a flowchart of a braking method of a motor-driven booster type brake system in accordance with one exemplary embodiment of the present disclosure.
Figure 4:
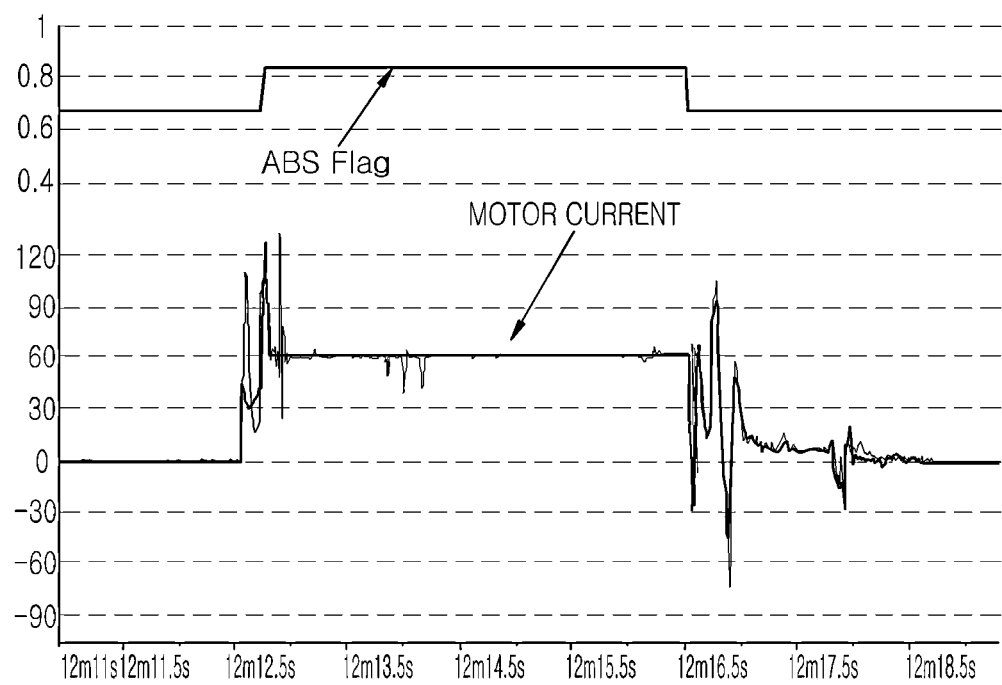
FIG. 4 is a graph depicting variation of electric current applied to a motor included in the booster in an ABS mode, in accordance with the exemplary embodiment of the present disclosure.

FIG. 2 is a schematic diagram of a motor-driven booster type brake system according to one exemplary embodiment, FIG. 3 is a flowchart of a braking method of a motor-driven booster type brake system according to one exemplary embodiment, and FIG. 4 is a graph depicting variation of input electric current applied to a motor included in the booster in an ABS mode, according to the exemplary embodiment.

Referring to FIGS. 2 to 4, exemplary embodiments will be described.

In FIG. 2, a motor-driven booster type brake system according to one exemplary embodiment includes a pedal force sensor 12 for sensing a detecting pedal force of a driver pressing on a brake pedal; a master cylinder 30 delivering hydraulic pressure to wheel brakes 70; a booster 20 delivering multiplied force to the master cylinder 30 using a motor 21; and an ECU (not shown) controlling the motor 21 based on a detection value of the pedal force. The ECU controls the motor 21 based on hydraulic pressure delivered from the master cylinder 30 to the wheel brakes 70 if an ABS mode is not activated, and controls the motor 21 by maintaining electric current input to the motor to be within a preset range of electric current if the ABS mode is activated.

Next, operation of the motor-driven booster type brake system according to the exemplary embodiment will be described in more detail with reference to FIGS. 2 to 4.

When a driver presses on a brake pedal 11, the pedal force sensor 12 senses pedal force on the brake pedal 11 and sends a detection result of the pedal force to the ECU (not shown), and a braking command is input to the ECU in S301. The pedal force sensor 12 may be realized by various kinds of sensors, such as a pedal angle sensor, and the like, which can sense the pedal force applied to the brake pedal 11.

Then, the ECU (not shown) calculates a target pressure with respect to hydraulic pressure delivered from the master cylinder 30 to the wheel brakes based on the detection value of the pedal force in S302. In calculation of the target pressure, the ECU may employ pressure detected by a pedal simulator 50 in addition to the detection value of the pedal force. The pedal simulator 50 serves to allow a driver to feel a sense of suitable braking by generating and delivering a pedal reactive force to the driver when the driver presses on the brake pedal.

The booster 20 multiplies the pedal force of the driver using the motor 21 and delivers the multiplied force to the master cylinder 30. Based on the multiplied force from the booster 20, the master cylinder 30 delivers hydraulic pressure to the wheel brakes 70 using fluid stored in a fluid container 40. Here, the hydraulic pressure delivered from the master cylinder 30 means the pressure of fluid delivered from the master cylinder 30 towards the wheel brakes 70 to generate desired friction braking force at the respective wheel brakes. The hydraulic pressure delivered from the master cylinder 30 may be measured by a pressure sensor (not shown) located near the master cylinder. Obviously, the location of the pressure sensor is not limited to near the master cylinder and the pressure sensor may be located at any other suitable position.

An electronic stability controller (ESC) 60 adjusts the hydraulic pressure delivered to the front and rear wheel brakes according to a braking mode to achieve suitable braking. Specifically, the electronic stability controller 60 allows a brake oil to be delivered to each of the wheel brakes in a normal operation mode, and allows ABS braking to be performed by closing (blocking) some oil passages in an ABS mode, that is, when at least one of wheels undergoes a locking phenomenon.

Then, the ECU determines whether the ABS mode is activated or not, in S303.

If it is determined in S303 that the ABS mode is activated, the ECU controls the motor 21 by adjusting torque of the motor 21 in the booster 20 in S304.

Next, the ECU ascertains whether electric current input to the motor 21 is within a preset range of electric current in S305. Here, if the electric current input to the motor 21 is not within the preset range of electric current, the process proceeds to the operation in S304 to adjust the electric current input to the motor 21 to be within the preset range of electric current. Namely, as shown in FIG. 4, when the brake system enters the ABS mode (an ABS flag is transited to a high level), electric current input to the motor is adjusted to be within a preset suitable range of electric current. By this operation, it is possible to inhibit an excessive increase in actual braking pressure applied to the wheel brakes 70 or significant fluctuation or divergence of the hydraulic pressure or braking pressure due to the hydraulic pressure delivered from the master cylinder 30 during operation of the ABS, thereby inhibiting failure of the brake system due to an excessive increase of the hydraulic pressure.

The preset range of electric current may be set based on a target pressure with respect to the hydraulic pressure, particularly, in proportion to the target pressure. For example, the preset range of electric current may be set in a linear proportion to the target pressure or in a non-linear proportion to the target pressure like a parabola curve. Namely, it is possible to minimize difference between a desired suitable braking force and an actual braking force by setting the range of electric current to be in proportion to the target pressure with respect to the hydraulic pressure.

If it is determined in S305 that the electric current input to the motor is within the preset range of electric current, hydraulic pressure generated in the master cylinder 30 is delivered towards the wheel brakes 70 in S308.

If it is determined in S303 that the ABS mode is not activated, the ECU adjusts the hydraulic pressure delivered from the master cylinder 30 towards the wheel brakes 70 by controlling the motor 21 of the booster 20 in S306.

Then, the ECU ascertains whether the hydraulic pressure delivered from the master cylinder 30 towards the wheel brakes 70 is within a preset range of pressure in S307. If it is determined that the hydraulic pressure of the master cylinder 30 is not within the preset range of pressure, the process returns to the operation in S307 to adjust the hydraulic pressure delivered from the master cylinder 30 to be within the preset range of pressure.

If it is determined in S307 that the hydraulic pressure generated in the master cylinder 30 is within the preset range of pressure, the hydraulic pressure is delivered from the master cylinder 30 towards the wheel brakes 70 in S308.

Finally, it is ascertained whether braking is finished in S309. If it is determined that braking is not finished, the process returns to the operation in S301 and repeats the operations described above. If it is ascertained that braking is finished, the system finishes the braking operation.

As such, according to the embodiments, the motor-driven booster type brake system and method thereof may inhibit fluctuation or divergence of hydraulic pressure due to an excessive increase or decrease in hydraulic pressure delivered from the master cylinder to the wheel brakes during vehicle braking in an ABS mode, thereby inhibiting failure of the brake system due to an excessive increase in hydraulic pressure.

Although some embodiments have been described, it should be understood that the embodiments are given by way of illustration only and is not to be construed as limiting, and that various modifications, variations, and alterations can be made by those skilled in the art without departing from the spirit and scope of the present disclosure, which are limited only by the accompanying claims and equivalents thereof.

What is claimed is:

1. A braking method of a motor-driven booster type brake system which includes a pedal force sensor for detecting pedal force of a driver applied to a brake pedal, a master cylinder delivering hydraulic pressure to wheel brakes, a booster delivering multiplied force to the master cylinder using a motor, and an ECU controlling the motor based on a detection value of the pedal force,
   wherein the ECU controls the motor based on hydraulic pressure delivered from the master cylinder to the wheel brakes if an ABS mode is not activated, and controls the motor by maintaining electric current input to the motor to be within a preset range of electric current if the ABS mode is activated.

2. The braking method of claim 1, comprising:
   inputting a braking command;
   calculating, based on the detection value of the pedal force, a target pressure with respect to the hydraulic pressure delivered from the master cylinder to the wheel brakes;
   determining whether the ABS mode is activated;
   controlling the motor by the ECU, if it is determined that the ABS mode is activated; and
   ascertaining whether the electric current input to the motor is within the preset range of electric current, followed by returning to the step of controlling the motor, if the electric current input to the motor is not within the preset range of electric current.

3. The braking method of claim 2, further comprising:
   adjusting the hydraulic pressure delivered from the master cylinder to the wheel brakes by controlling the motor by the ECU, if it is determined that the ABS mode is not activated; and
   ascertaining whether the hydraulic pressure delivered from the master cylinder to the wheel brakes is within a preset range of pressure, followed by returning to the step of adjusting the hydraulic pressure, if the hydraulic pressure is not within the preset range of pressure.

4. The braking method of claim 2, wherein the preset range of electric current is set based on the target pressure with respect to the hydraulic pressure.

5. The braking method of claim 4, wherein the preset range of electric current is set in proportion to the target pressure.

6. A motor-driven booster type brake system, comprising:
   a pedal force sensor for detecting pedal force of a driver applied to a brake pedal;
   a master cylinder delivering hydraulic pressure to wheel brakes;
   a booster delivering multiplied force to the master cylinder using a motor; and
   an ECU controlling the motor based on a detection value of the pedal force,
   wherein the ECU controls the motor based on hydraulic pressure delivered from the master cylinder to the wheel brakes if an ABS mode is not activated, and controls the motor by maintaining electric current input to the motor to be within a preset range of electric current if the ABS mode is activated.

7. The brake system of claim 6, wherein, if it is determined that the ABS mode is not activated, the ECU adjusts the hydraulic pressure delivered from the master cylinder to the wheel brakes to be within a preset range of pressure.

8. The brake system of claim 6, wherein the ECU calculates, in response to a braking command, a target pressure with respect to the hydraulic pressure delivered from the master cylinder to the wheel brakes based on the detection value of the pedal force.

9. The brake system of claim 8, wherein the preset range of electric current is set based on the target pressure with respect to the hydraulic pressure.

10. The brake system of claim 9, wherein the preset range of electric current is set in proportion to the target pressure.

* * * * *